Figure 1:
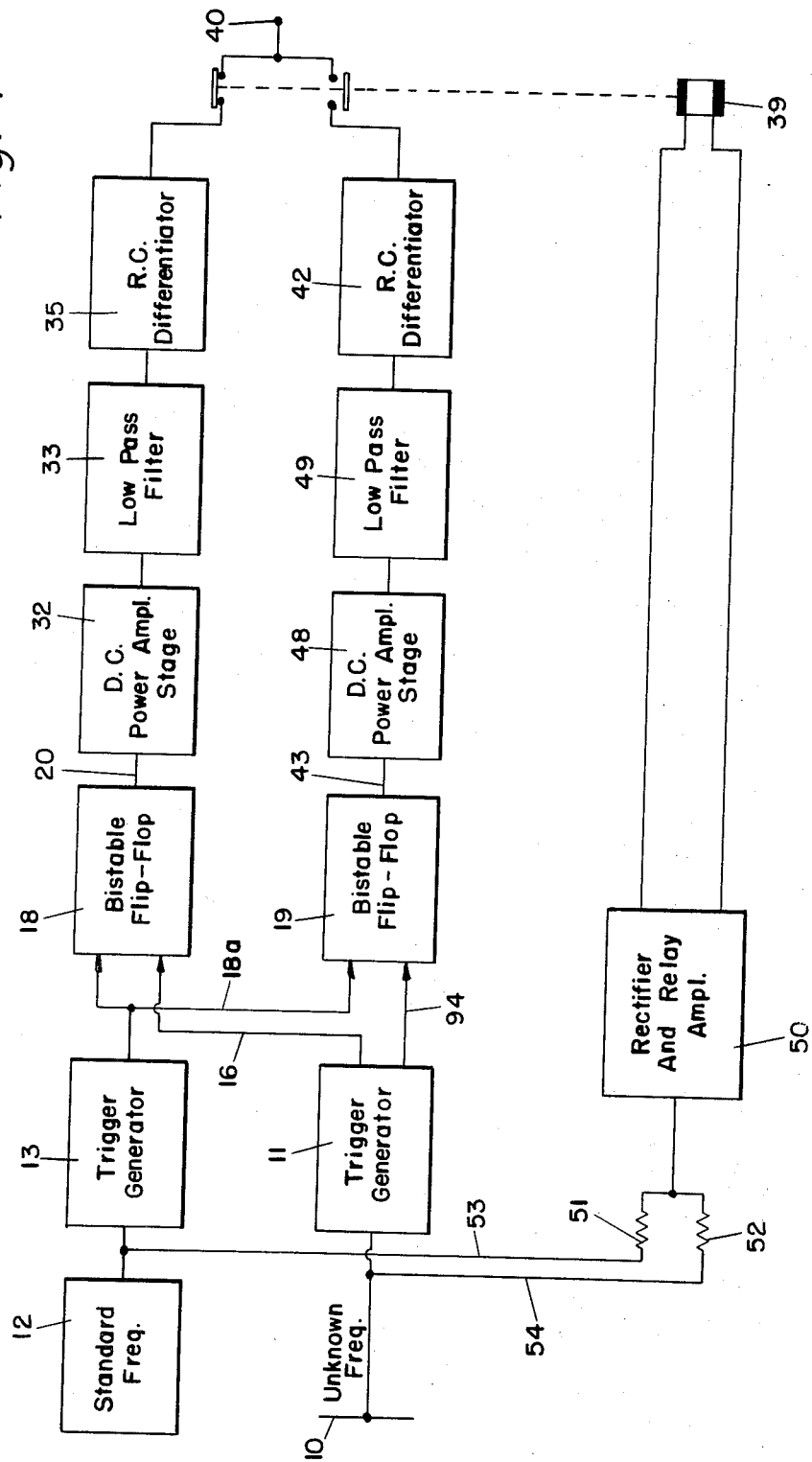

Feb. 15, 1966  D. W. TURRELL  3,235,800
SYSTEM FOR MEASURING FREQUENCY BY COMPARING UNKNOWN TO
REFERENCE AND DETERMINING THE RATE OF CHANGE OF PHASE
Filed June 26, 1961
3 Sheets-Sheet 1

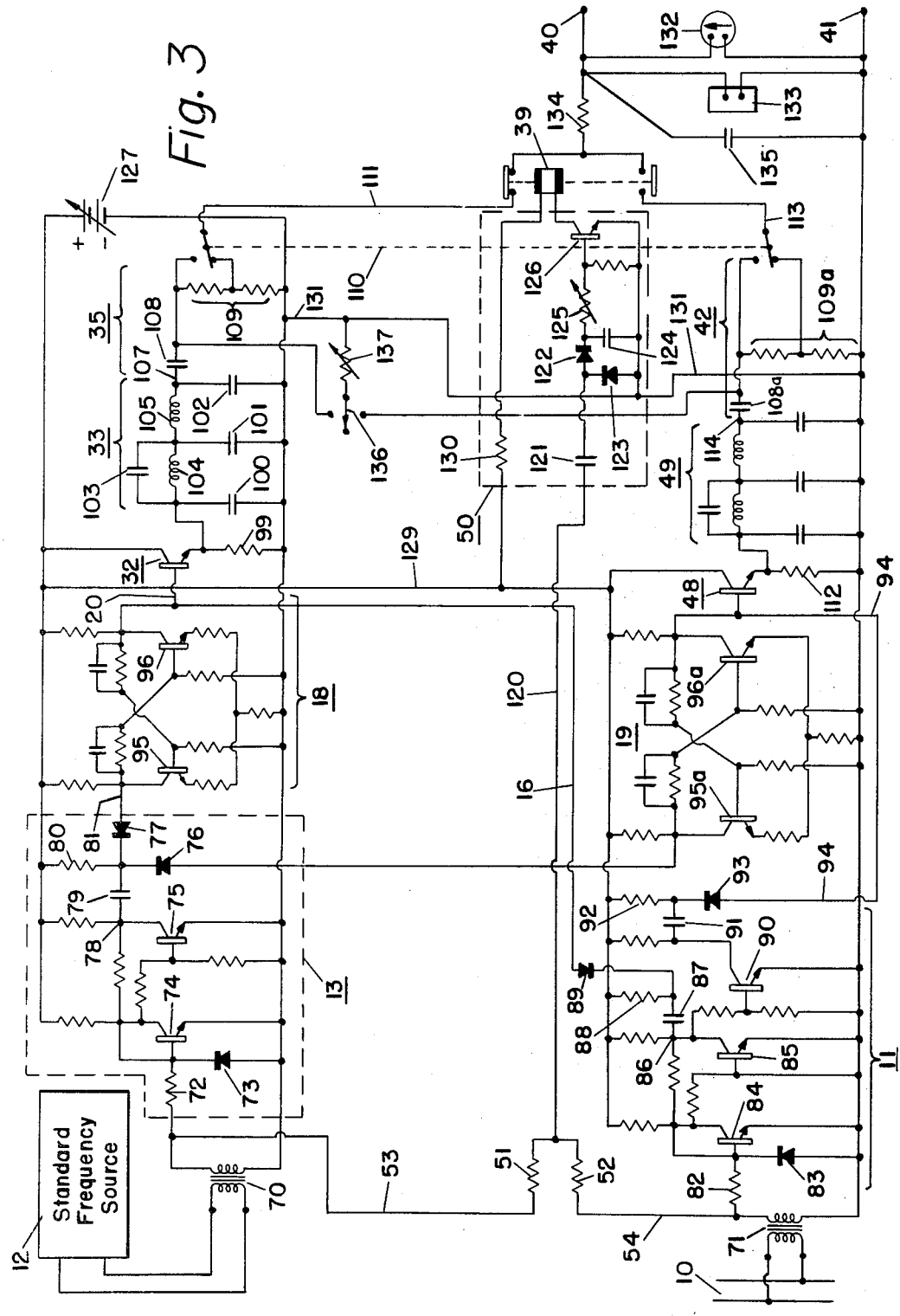

United States Patent Office 3,235,800
Patented Feb. 15, 1966

3,235,800
SYSTEM FOR MEASURING FREQUENCY BY COMPARING UNKNOWN TO REFERENCE AND DETERMINING THE RATE OF CHANGE OF PHASE
Douglas W. Turrell, North Wales, Pa., assignor to Leeds and Northrup Company, Philadelphia, Pa., a corporation of Pennsylvania
Filed June 26, 1961, Ser. No. 119,724
9 Claims. (Cl. 324—79)

This invention relates to methods of and means for measuring deviations in frequency of an unknown source from a standard or reference frequency and has for an object the provision of a reliable system of high precision and sensitivity.

The division of load among generators and generating stations has in an increasing number of systems included as a component of the control signal the deviation of systems frequency from the normal frequency of 60 cycles per second. As interconnections of power systems have increased in number and as integrated power systems themselves have grown in size, the deviations in system frequency from its standard or reference value of 60 cycles per second for a given change in system load has decreased. Accordingly, the sensitivity requirements of systems responsive to changes in frequency have increased in order for them to respond to these smaller changes, smaller than the normal sensitivities of conventional measuring systems. Thus, the sensitivities of frequency-responsive bridges are becoming inadequate to meet modern day requirements in the regulation and control of generation in response to changes in system frequency. Moreover, such bridges include resistors and capacitors, both inherently subject to change due to change in ambient temperature as well as aging.

It is an object of the present invention to provide for the generation of a signal which varies with the difference in phase between a standard frequency and an unknown frequency and for the differentiation of that signal to produce an output signal proportional to the difference between the standard frequency and the unknown system frequency.

It is a further object of the invention to provide a system for producing an output signal proportional to the difference between a standard or reference frequency and an unknown system frequency, which output signal is of relatively large magnitude though the difference between said frequencies is a very low order.

It is a further object of the invention to provide an output signal of the foregoing character from a measuring system characterized by the absence of circuit-adjusting means, such as slidewires, selsyns and the like.

It is a further object of the invention to provide a frequency-measuring system from static components having a sensitivity of a high order, such for example as 0.0002 cycle per second, which is representative of three and one-third parts per million of a standard frequency of 60 cycles per second.

In carrying out the present invention in one form thereof, there is generated a first signal having a characteristic which varies with the difference in phase between a standard frequency and an unknown frequency and which has a repetitive pattern of said characteristic of the phase angle difference. That signal between its maximum and minimum values varies linearly with said difference in phase. By differentiating with respect to time a substantial fraction of a linearly varying portion of the first signal, there is obtained a measure of the slope of the linearly varying portion, and this measure of the slope provides a measure of the difference between the standard or reference frequency and the unknown frequency.

By reason of the differentiation of a fractional part of the linearly varying signal, there is avoided the appearance in the measuring system of transients due to transition points between adjacent cycles of the repetitive pattern where a reset between the maximum and minimum values occurs.

In a preferred embodiment of the invention, a standard or reference frequency and the unknown frequency may be utilized to control the operation respectively of trigger generators having outputs applied to bistable flip-flop circuits which, under the control of the trigger generators, produce a succession of rectangular pulses of constant minimum and maximum values. The time duration of each rectangular pulse is controlled in accordance with the phase difference between the two frequencies. The rectagular pulses are averaged to produce a first signal which varies linearly with phase difference between maximum and minimum limits. This signal is then applied to a differentiator which produces an output proportional to the difference between the standard or reference frequency and the unknown frequency. It is in this manner that a static system of high absolute precision and great absolute sensitivity is provided from a deviation system of lesser precision and sensitivity in conjunction with a high precision reference. This produces a measure of frequency which is substantially independent of changes in ambient temperature and of aging of the component parts. In this preferred system, the above-mentioned transients are eliminated by utilizing only a selected linear portion of each of said linearly changing signals.

Further to provide a continuously changing output with change of the difference frequency, there will be provided two dephased linearly changing signals with switching occurring at points intermediate their limits thereby to provide the desired continuous response with avoidance of transients which would otherwise introduce disturbances into the output.

Figure 2:
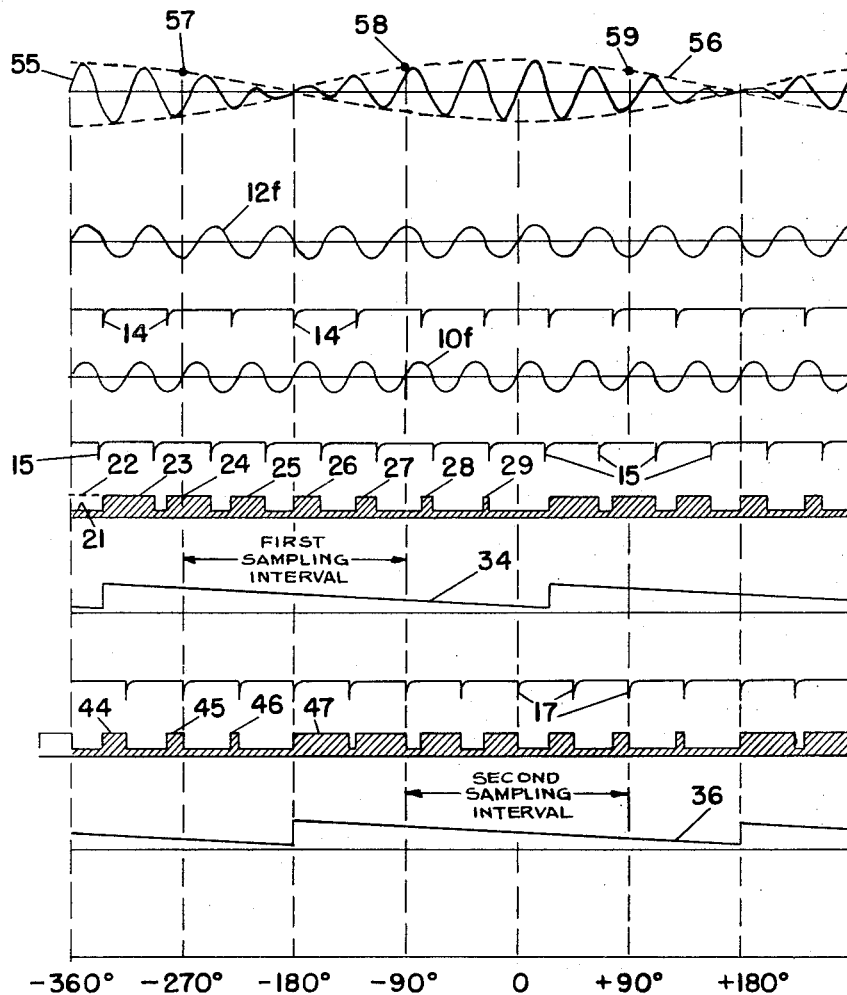

For further objects and advantages of the invention, for additional discussion of background theory and for typical embodiments of the invention, reference is to be had to the following description taken in conjunction with the accompanying drawings, in which:

FIG. 1 is a block diagram of a preferred system embodying the invention;

FIG. 2 is a timing diagram on which there appear a plurality of graphs illustrative of the operation of the invention. The abscissae is time for all of the signals. The degree-scale along the abscissae is in terms of the phase difference between the signal of unknown frequency and the reference signal; and FIG. 3 is a wiring diagram providing details of the block diagram of FIG. 1.

Referring now to the block diagram of FIG. 1, an unknown frequency as derived, for example, from a power line 10 is applied to a trigger generator 11. A standard or reference frequency may be developed in conventional manner as by a crystal-controlled oscillator system indicated by the box 12 and is applied to a trigger generator 13. In the description of the system of FIGS. 1 and 3, it will be helpful to refer to the timing diagram of FIG. 2 on which the standard or reference frequency has been illustrated at 12$f$ and a constant but higher unknown frequency at 10$f$.

At the end of the first half cycle (180°) of the reference frequency 12$f$ with a negative-going zero-axis crossing the negative signal applied at trigger generator 13 produces at its output a negative-going trigger pulse 14. Similarly, upon development of a negative signal at the negative-going zero-axis crossing following the first half cycle of the unkown frequency 10$f$, the trigger generator 11 produces a negative-going output pulse 15. It will be observed that the pulse 15 occurs increasingly earlier in time than the pulse 14 by reason of the illustrated difference in frequency between the standard or reference frequency 12$f$ and the unknown frequency 10$f$.

It is to be further observed that the trigger generator 11 has two outputs. The pulse 15 is developed on the output conductor 16. A second negative pulse 17 is developed by the trigger generator 11 at the end of the first complete cycle (360° or 0°) of the unkown frequency 10$f$ and at every positive-going zero-axis crossing thereafter.

There will now be considered the operation of a pair of bistable flip-flop circuits 18 and 19, each having a pair of input circuits and each having a single output circuit. Considering first the flip-flop circuit 18, its output circuit 20 will be assumed to be "down," that is, have a minimum output. However, the application to the input 18$a$ of flip-flop circuit 18 of a negative-going pulse 14 as developed by the trigger generator 13 will cause the bistable circuit 18 to produce a constant but increased output as illustrated by the change from a minimum output 21 to a maximum output 22 of FIG. 2. The output from the circuit 18 continues until there is produced a negative-going pulse 15 by the trigger generator 11 which is applied to its input on conductor 16.

Though in actual practice the system frequency as appearing on the transmission line 10 may be constantly varying, it will be helpful for purposes of analysis and explanation of the operation of the invention to assume, as in FIG. 2, a constant difference between the standard or reference frequency 12$f$ as developed by the source 12 and the unknown frequency 10$f$. It is a characteristic of two signals which differ in frequency by a fixed amount to produce a linear change in phase between the two signals. Such a change in phase relation may be conventionally represented by the angular difference between two vectors rotating at slightly different speeds. Their phase displacement will be linearly related to their difference in speed or frequency. In FIG. 2 the foregoing linear change likewise is illustrated by the sucession of rectangular pulses 23–29, each of progressively lesser duration. They are of lesser duration for the following reasons.

Immediately after termination of the rectangular pulse 23 by the pulse 15, the second of the trigger pulses 14 appears and operates the bistable flip-flop 18 again to produce a high level output which marks the beginning of the second rectangular pulse 24. This pulse is terminated upon generation of the third of the trigger pulses 15. Since the phase difference between the unknown frequency and the known frequency is progressively increasing, the spacing between each of the trigger pulses 14 and the next succeeding trigger pulses 15 is decreasing. This explains how the rectangular pulses 23–29 are of successively decreasing duration for each cycle of the difference frequency.

For convenience, in FIG. 2 the abscissae has been illustrated with a scale from −360° to something in excess of +180°. The abscissae scale represents the phase angle difference between the standard or reference frequency 12$f$ and the unknown frequency 10$f$. This phase angle difference for a constant difference in frequencies constantly varies as from −360° to 0° and thence to +360°, etc.

Though not essential, it is preferred that there be utilized with the bistable flip-flop 18 a buffer amplifier 32 which provides isolation between the flip-flop circuit 18 and the succeeding circuitry now to be described. By applying a succession of rectangular pulses 23–29 to a low pass filter 33 which functions as an averaging device, there is produced an output signal 34, FIG. 2, which, it will be observed, is of the ramp-function type, i.e., its beginning is a maximum and it decreases linearly to a minimum value for the reason that the average value of the pulses 23–29 is decreasing from a maximum value occurring when there are substantially no gaps between the pulses to a minimum value where the duration of the pulse is extremely short and the gaps large. The application of rectangular pulses 23–29 produces from the low pass filter the succession of ramp-function outputs which may be characterized as an output of sawtooth character with a reset occurring between the adjacent ramp-functions. The output signal 34 is at all times representative of the average value of the rectangular pulses obtained from bistable flip-flop 18. Since these pulses vary in length in proportion to the varying phase difference between the frequencies 12$f$ and 10$f$, the average value likewise varies linearly with this phase difference.

Inasmuch as the rate of change of the phase difference is proportional to the difference between the unknown frequency and the reference frequency, it will be seen that the slope of the line 34, representative of the ramp-function signal, is proportional to the difference frequency. Accordingly, the output from the low pass filter is applied to a differentiating circuit 35 and produces an output signal having a magnitude proportional to the slope of the ramp-function signal 34, i.e., the rate of change of said signal. Accordingly, the output from the differentiating circuit 35 is a signal proportional to the difference between the unknown frequency and the standard frequency, and from output terminal 40 may be applied to any conventional indicator, measuring circuit or control system.

In order to avoid in the output, and particularly at output terminal 40, transients due to the reset of the ramp-function signal 34 from its minimum value to its next appearing maximum value, or vice versa, for increasing ramps 34, there is only utilized a portion of the ramp-function signal 34, such, for example, as indicated by the label in FIG. 2, "First Sampling Interval." This sampling interval has a termination which is arranged to coincide with a "Second Sampling Interval" as appearing on a second ramp-function signal 36. In terms of the system of FIG. 1, the output from the differentiator 35 during the first sampling interval is applied by way of the normally closed contacts of a relay 39 to an output terminal 40. At the end of the first sampling period, the relay 39 is energized to apply through its normally open contacts the output from a second differentiator 42 a signal representative of the slope of the ramp-function 36.

In the assumed case of a constant difference between the unknown frequency and the standard frequency, the slope of the ramp-functions 34 and 36 will be equal and, therefore, the output at terminal 40 will be constant, notwithstanding the change from the signal developed during the first sampling interval to the signal developed during the second sampling interval.

The manner in which the ramp-function 36 is generated will now be described.

It will be observed that the trigger outputs from the trigger generator 13 are applied both to the bistable flip-flop circuit 18 and to a second bistable flip-flop 19. These flip-flops are the same in that the trigger pulses from generator 13 both produce maximum outputs at their respective outputs 20 and 43. When the flip-flop circuit 18 was switched to produce a minimum output on the conductor 20 as the unknown frequency signal 10$f$ at a zero-axis crossing changed from positive to negative, the bistable circuit 19 changes its output from maximum to minimum as the unknown frequency signal 10$f$ has a zero-axis crossing from negative to positive, and as indicated in FIG. 2 by the appearance of one of the pulses 17. The pulses 17 from trigger generator 11 are produced as the unknown signal 10$f$ changes from negative to positive (0° at the unknown frequency 10$f$).

The foregoing results in the production of the rectangular pulses 44–46 and those following. Since their terminations are 180° later, that is, 180° out of phase at the unknown frequency with the termination of the pulses 23–29, a new series begins with the pulse 47. The foregoing means that the sampling intervals may be taken at an intermediate portion of the output 34 and at an intermediate portion of the output 36, and preferably following at least the first rectangular pulse marking the beginning of each of the cyclically repeated signals 34 and 36. Besides the reset change in amplitude between minimum and maximum of the successive ramp-functions 34 and 36, it will be seen that in respect to the rectangular output pulse 47, one of the trigger pulses 17 from trigger generator 11 is tending to reduce the output of bistable circuit 19 to its minimum value, whereas at the same instant one of the pulses 14 is endeavoring to switch circuit 19 to produce a maximum output. Inasmuch as either switching pulse may predominate, the presence or absence of the first rectangular pulse will be unknown. It will be desirable to eliminate this ambiguity in operation from the signals utilized for measurement purposes as described above. Thus, the sampling intervals are spaced from the randomly occurring first rectangular pulses following the resetting. These sampling intervals are also terminated safely in advance of the minimum values of each output function 34 and 36 and their succeeding maximum values.

In order to control the relay 39 to produce the above-described operation for the sampling intervals, there are utilized a rectifier and relay amplifier 50 having applied thereto, through summing resistors 51 and 52, the standard or reference frequency signal by way of conductor 53 and the unknown frequency signal by way of conductor 54. Accordingly, the input to the rectifier 50 will be as illustrated by the signal 55 of FIG. 2, that is, the algebraic sum of the known frequency signal 12f and the unknown frequency signal 10f. The output from the rectifier and as applied to its associated amplifier will correspond with the positive half of the envelope 56 of the summation signal 55. When the magnitude of that signal decreases from a maximum to the value indicated at 57, the relay 39 is deenergized for operation to its illustrated position. As the output again increases to a value as indicated at 58, the relay is energized to terminate the first sampling period and to initiate the second sampling period. This interval continues until the output again decreases to the value indicated at 59 to terminate the second sampling period and to initiate a further sampling period corresponding with the first one.

For any given difference in frequency between signals 12f and 10f, the sampling intervals may vary in duration and the first interval may differ from the second. These differences have no effect, however, upon the precision of measurement in that the differentiating circuit in each case provides an output signal proportional to the slope or rate of change of the average signals, and thus is independent of the durations of the sampling intervals. In this connection, the relay 39 may be of a type which requires a somewhat greater energization to open its normally closed contacts and to close its normally open contacts than the corresponding drop-out value for that relay.

In general, each of the trigger generator, flip-flop combinations produces in its corresponding channel a series or train of pulses each initiated when one of the frequency signals crosses zero in a designated direction and terminated when the other frequency signal next crosses zero in a particular direction. The low pass filter of each channel converts the pulses into sawtoooth signals for a constant difference frequency whose repetition frequency corresponds with the difference between the frequencies of the inputs to the channels and whose direction of slope depends upon which input frequency is the higher. The differentiated output signals of the filters, as selected by relay 39 under control of a signal 56 which varies at the difference frequency of the sources, provides a unidirectional output signal whose amplitude is representative of the difference between the input frequencies and whose polarity depends upon the sense of the deviation between the input frequencies.

With the above understanding of the basic theory underlying the present invention and the block diagram execution of the invention shown in FIG. 1, it will be understood that the methods thereof may be practiced with widely differing apparatus known to those skilled in the art. In the system of FIG. 3, there has been illustrated a wiring diagram in which the several static electronic circuits for performing the several method steps include transistors, diodes and the usual resistors, capacitors and inductances. While transistors are desirable for use in the present invention, it is to be understood that vacuum tubes and other switching devices may be utilized. For convenience, many of the same reference characters used in FIG. 1 will be utilized for corresponding parts in FIG. 3.

Referring now to FIG. 3, the standard or reference frequency source 12 is coupled to the trigger generator circuit 13 by an input transformer 70, a corresponding input transformer 71 serving a like function between the unkown frequency source, as the power system supply lines 10, and the trigger generator 11. The transformers 70 and 71 provide desired circuit isolation and impedance transformation for applying their respective input signals to the control circuits of square wave generators 13 and 11 of the Schmidt type. Thus, the generator 13 includes an input resistor 72, an input diode 73, transistors 74 and 75 together with output diodes 76 and 77. A Schmidt square wave generator produces square wave output voltages as at the output point 78 of transistor 75. Such square wave output signals are applied to a differentiating circuit comprising a capacitor 79 and a resistor 80, thereby to generate positive and negative trigger pulses. Only negative-going trigger pulses are developed at the output conductor 81 due to the polarity of the connection of the output diode 77. It is in this manner that there are generated the trigger pulses 14 of FIG. 2.

Similarly, the input resistor 82, input diode 83 and the transistors 84 and 85 produce square wave outputs at the output point 86 of transistor 85. A differentiating circuit formed by a capacitor 87 and a resistor 88 produces positive and negative-going pulses. Only the negative-going pulses are transmitted by a diode 89 to an output conductor 16 for application to the bistable flip-flop circuit 18. Inasmuch as the trigger generating circuit 11 has two negative pulse outputs, one 180° from the other in terms of the unknown frequency signal from the lines 10, there is provided an additional transistor stage 90 also provided with a differentiating circuit comprising the capacitor 91 and the resistor 92 together with an output diode 93 for producing the negative trigger pulses 17 of FIG. 2 and which are applied by way of an output conductor 94 to the bistable flip-flop circuit 19.

The bistable flip-flop circuits 18 and 19 are conventional. Thus, the flip-flop circuit 18 includes a pair of transistors 95 and 96 with cross-connections between the collectors and bases thereof. The application to the input circuit 81 of a negative-going input trigger pulse 14 causes the transistor 95 to conduct and turns off the transistor 96. The result is that the potential at the output conductor 20 rises to its maximum value. This corresponds with the maximum value 22 of FIG. 2 for the first pulse 23. The application to the flip-flop circuit 18 of a second negative-going pulse, such as pulse 15 of FIG. 2, by way of input conductor 16 turns on the transistor 96 and turns off the transistor 95 to reduce to its minimum value the output potential on conductor 20. The resultant rectangular pulses applied to a transistor 32, connected as a simple amplifier, produce from the output resistor99 rectangular pulses applied to a transistor 32, connected as a simple amplifier, produce from the output resistor 99 rectangular pulses which are then applied to the low pass filter 33 shown as including capacitors 100, 101, 102 and 103 and inductors 104 and 105. The capacitors 100–103 and the inductors 104 and 105 will have values selected one with respect to the other so as to provide maximum rejection or attenuation of standard frequency signals (normally 60 cycles) with little, if any, attenuation of the average values of the square wave pulses applied thereto.

The design of low pass filters is well understood by those skilled in the art and the particular values and circuit configuration selected may widely vary to achieve the foregoing result. The output of the filter 33 as appearing at conductor 107, as before indicated, represents the average value of the rectangular pulses. That output is applied to a differentiator circuit 35 comprising a capacitor 108 and a tapped resistor 109. For high sensitivity, the RC product of capacitor 108 and resistor 109 should be as high as possible consistent with the requirement that the value of resistor 109 should be as low as possible to minimize the effect of the load imposed by the recorder, data amplifier or other output device represented by instrument 132. Only a fraction of the tapped resistor 109 is shown included in the circuit. If a range-changing switch 110 be operated from the illustrated position to the uppermost position, then the whole of resistor 109 will be included in the circuit and maximum sensitivity or maximum output signal for a given frequency difference will be obtained. By way of example, with an attained output sensitivity of ±25 millivolts for a ±0.05 cycle per second frequency difference, and the output meter 132 having a ±25 millivolt range, full-scale ranges of ±0.05 cycle and ±0.25 cycle for the two positions of switch 110 may be attained. In any case, the output signal as developed at conductor 111 will be proportional to the slope or rate of change of the signal 34 of FIG. 2 as developed at the output conductor 107 of the filter 33.

The average voltage appearing at conductor 107 is applied to the series combination of capacitor 108 and resistor 109. Under conditions of constant phase difference (corresponding with zero frequency difference) between the input frequencies, the voltage on conductor 107 is constant and the voltage across capacitor 108 will become equal and opposite in the series circuit to the voltage between conductors 107 and 131. Under these conditions, no current will flow through the resistor 109 indicating zero frequency difference. If the unknown frequency 10f becomes higher than the reference frequency 12f, the voltage at 107 will linearly decrease as shown at 34, FIG. 2. This decreasing voltage will cause the capacitor 108, by virtue of its charge, to produce a current flow into conductor 107 which is proportional to the rate of change of voltage on conductor 107. Thus, the voltage appearing across resistor 109 proportional to this current which flows through the resistor 109, causes conductor 111 to become negative with respect to conductor 131. Conversely, if the unknown frequency 10f becomes less than the reference frequency 12f, the flow of current is in the opposite direction to produce a positive voltage on conductor 111 relative to conductor 131. The capacitor 108a functions in a similar manner so that the output signal of the output terminals 40 will be of one sign or the other depending upon the direction of the frequency-deviation from the reference value.

It is again emphasized that the ramp function signal 34 of FIG. 2 appears by reason of the earlier assumption of a constant difference between the unknown frequency and the standard frequency. The output signal as developed at output conductor 111 will always be proportional to the rate of change of the signal developed at the conductor 107 by the low pass filter 33.

The bistable flip-flop circuit 19 is identical with the bistable circuit 18 and, accordingly, the parts have been given the same reference characters with the subscript $a$ added thereto. The buffer amplifier including a transistor 48 together with its output resistor 112 operates in manner already described for the transistor 32 and so does the low pass filter 49 as well as the differentiating circuit 42. The latter includes a tapped output resistor 109a in association with other contacts of the range-changing switch 110.

The output signal from the differentiating circuit 42 as appearing at output conductor 113 is proportional at at all times to the rate of change of the output signal developed on the conductor 114 of low pass filter 49. However, the signal developed at the conductor 113 is isolated from the output terminal 40 by reason of the fact the lower contacts of relay 39 are in their open positions. The relay 39 is controlled by a rectifier and relay amplifier 50 which has applied thereto by way of the summation resistors 51 and 52 an alternating current input signal as on conductor 120 which varies at the difference frequency between the standard frequency and the unknown frequency applied to the transformers 70 and 71 and as illustrated by the summation signal 55 of FIG. 2.

The summation signal is applied to a coupling capacitor 121 and thence to a pair of diodes 122 and 123 connected as a halfwave rectifier for developing across a capacitor 124 a unidirectional output voltage corresponding with the envelope of the output signal 55 as illustrated in FIG. 2. The unidirectional output signal is applied to a rheostat 125 in series with the input to a transistor 126 connected as an amplifier for producing the needed energization for operation of the relay 39. By adjusting the input rheostat 125, the operation of the relay 39 may be adjusted for desired energization and drop-out values, such as illustrated by the points 57–59 on the envelope 56 of FIG. 2. Though the source of supply for the several circuits above described is evident, it will be helpful to trace the source of supply for the amplifier 126 as from a battery 127 by way of conductors 128 and 129, a resistor 130, the coil of relay 39 and thence through the transistor 126 to the return conductor 131 and to the other side of the adjustable unidirectional source illustrated as battery 127.

The system of FIG. 3 functioning as described in detail for its block diagram counterpart of FIG. 1 functions to produce at the output terminals 40 and 41 an output voltage at all times proportional to the difference between the unknown frequency and the frequency of the reference or standard source. Thus, that output voltage of one polarity or the other may be applied to an indicating and/or recording instrument 132, or it may be applied to a control instrumentality 133 which may in conventional manner be utilized to regulate generation to return the system frequency of supply lines 10 toward the reference or standard value.

Whenever the output signal at the terminal 40 is positive, it will be known that the unknown frequency is less than the standard frequency. When the output at terminal 40 is negative, then the unknown frequency will be greater than the standard frequency. When the output signal at 40 is zero, it will be known that the unknown frequency is equal to the standard or reference frequency. It will, in general, be desirable to include an output resistor 134 and an output capacitor 135 to form a low pass filter, thereby to isolate from the output terminals and the associated output circuits any rapidly changing signals which may be applied to the output conductors 111 and 113. In addition, the capacitor 135 maintains on the output circuit 40, 41 during the time the output signal applied by way of resistor 134 is interrupted, the last value of that output signal.

In the above description, it has been assumed that the magnitude of the output signal as developed on conductor 113 will be the same as that developed on the output conductor 111 in their linearly varying intervals. In order to assure their equality, there is provided a calibrating switch 136 together with a calibrating resistor 137. If upon measurement there be a difference between the signals on conductors 111 and 113, then the calibrating switch 136 is operated to complete a circuit to connect resistor 137 in parallel with that one of output resistors 109 and 109a having the greater unadjusted output signal. The calibrating resistor 137 is then adjusted in value until there is attained equality between the signals developed at conductors 111 and 113. The described calibration need be checked but infrequently and only in event of change in value of the circuit components due to aging.

In calibrating, the input to transformer 71 may be supplied from a crystal-controlled oscillator operating with different crystals providing, for example, output frequencies of 60.040 c.p.s. (cycles per second) and 60.20 c.p.s. for checking the 90% points on the ±0.05 and ±0.25 c.p.s. ranges. Knowledge of the exact output frequency from the calibrating oscillator is not important, since accurate determination of the actual difference frequency may be made by timing the operation of the switching relay 39 over several cycles of the difference frequency. Channel balance is now effected as above described by switching the channel balance attenuator 137 to the channel having the highest output and adjusting it until balanced output is attained. Calibration can be simultaneously adjusted by adjusting the voltage of the source 127 as this adjusts the maximum values of pulses 23–29 and 44–47 of FIG. 2. A check for a minus frequency deviation can be accomplished merely by interchanging the inputs to transformers 70 and 71. Slight adjustments of channel balance and calibration may be required for optimum calibration and channel balance at both plus and minus frequency deviations.

It is emphasized again that for clarity in describing the invention there was initially assumed and maintained throughout most of the description the assumption of a constant difference between the unknown frequency from lines 10 and the standard frequency from source 12. In practice, such a condition will seldom, if ever, be realized and as already noted, the frequency of power supply lines may be constantly changing both above and below the standard or reference frequency. Accordingly, the sawtooth ramp-functions 34 and 36 of FIG. 2 may be changed from those having negative slope to ramp-functions having positive slopes, and, in fact, "ramp" functions may not be particularly descriptive of the signals 34 and 36 where the unknown frequency may be swinging both above and below the reference frequency.

Notwithstanding the complexity of the frequency changes on lines 10, there will be developed at output conductors 107 and 114 signals at all times proportional to the difference in phase between the reference or standard frequency and the line frequency. Thus, this signal when differentiated by the differentiating circuits 35 and 42 will at all times provide at the output terminals 40 and 41, output signals proportional to the difference frequency, as between the unknown and the reference frequencies.

It has been determined in practice that a system constructed as described above operates with great precision when a precise standard or reference frequency is developed by the source 12. At zero deviation between the standard or reference frequency and the line frequency 10, the precision is that of the standard or reference frequency at source 12. Errors proportional to the deviation frequency can be held to within plus or minus five-tenths percent of the deviation frequency. In this connection, it is noted again that full scale for the indicating and recording instrument 132 may ordinarily be but a fraction of a cycle per second. Full scale may be as low as plus or minus 0.05 cycle per second. The instrument 132 may be of the null type with the reference value at the center of the scale and operable in each direction from that reference value in correspondence with the sense of deviation of frequency 10f from the reference frequency 12f. Since, however, the output signal is a practically noise-free analog signal with very high resolution and minimum time lag, it is also suited for use in analog type computer circuits applicable to load-frequency regulation of power-generating systems.

With the above understanding of the invention, it will be seen at once that it may be practiced with apparatus of different kinds, and that in general the phase-deviation of the unknown input-frequency from the standard or reference frequency is used to generate a D.C. voltage proportional to this phase-deviation. That D.C. voltage after application to a diffentiating circuit results in a system output proportional to the frequency deviations and of polarity corresponding with the direction of frequency deviation. Mathematically, for a constant frequency deviation, the output may be expressed as follows:

$$E_o = E_1 \times \Delta f \times RC \tag{1}$$

where $E_o$=output of differentiating circuit in volts;
$E_1$=volts change in output of linear phase demodulator for 360° (1 cycle) change in phase of input frequency with respect to standard frequency (22 minus 21, FIG. 2);
$\Delta f$=cycles per second difference between unknown and standard frequencies;
$RC$=time constant in seconds of differentiating circuit (108, 109 or 108a, 109a, FIG. 3).

Due to the characteristic of linear electronic phase demodulators to reset from maximum to minium value or vice versa when the phase between the reference and unknown signals goes through 360°, two measurement channels are used with the output of the second phase demodulator displaced from the first by approximately a 180° deviation angle between the two inputs. This second phase detector output is applied to a second RC differentiator, and an output switching relay is used to measure the channel that is between 90° and 270° phase displacement between its input and the standard or reference frequency signal.

Alternatively, a single measurement channel may be used sequentially to provide the two phase-displaced signals 34 and 36. To accomplish this result, the output pulses from one of the bistable flip-flops may be arranged to be selectively decreased to their minimum values by either of the outputs 15 or 17, FIG. 2, from the unknown frequency trigger generator 11. Such selection may be accomplished in manner similar to that represented by rectifier and relay amplifier 50. Inasmuch as switching transients may be produced in such a situation, means for suppressing these transients will be used. One such means is momentarily to interrupt by relays the connection between differentiator and the output terminal 40 each time the selection is changed.

While the low pass filter 33 has been shown in FIGS. 1 and 3 preceding the RC differentiator 35, it is to be understood that the order in which they appear in the circuit is not necessarily as shown, but may be reversed with the RC differentiator 35 connected to the D.C. power amplifier stage 32 and the low pass filter 33 connected between the differentiator 35 and the output terminal 40.

Preferably, the switching is accomplished by the simple phase-sensitive circuit in which the switching rate in cycles per second is equal to unity divided by the time per cycle. This fact is of assistance in calibrating the system as a whole.

Reference is to be had to the appended claims for definitions of systems and methods comprehended by the present invention. In the claims, the phrase "reference frequency" is to be taken as including a frequency generated from a standard source, i.e., one which produces an output signal which to a high degree of precision is constant at a selected frequency. It also includes a frequency which may vary and, nevertheless, is to be compared with an unknown frequency. This may occur when one generator or alternator is selected as the reference source, and the output from another alternator as the unknown.

What is claimed is:

1. A frequency measuring system comprising a square wave generator having an output, means responsive to an unknown frequency and to a reference frequency, said last named means being connected to said generator for initiating a square wave at said output each time the waveform of one of said frequencies passes through zero in a selected direction and for terminating each said square wave as the waveform of the other of said frequencies next passes through zero in a selected direction, averaging means connected to the output of said square wave generator for producing a first signal varying at a rate proportional to the difference between said frequencies, and differentiating means connected to receive said first signal for producing an output signal having a magnitude proportional to said rate of change of said first signal as a measure of the difference between said frequencies.

2. A frequency-measuring system comprising:
first and second pulse generators,
means for applying to said first pulse generator an alternating voltage of a predetermined reference frequency,
means for applying to said second pulse generator an alternating voltage of an unknown frequency,
said first pulse generator including a control circuit receiving said reference frequency for producing a control pulse each time during a cycle that the alternating voltage of said reference frequency passes through zero in a particular direction,
said second pulse generator including a control circuit receiving said unknown frequency for producing a control pulse each time during a cycle that the alternating voltage of said unknown frequency passes through zero in a particular direction,
a square wave generator connected to said pulse generators for initiating square wave pulses upon appearance of control pulses from one of said pulse generators and terminating each of said square wave pulses upon appearance of control pulses from the other of said pulse generators,
an averaging circuit,
means for applying said square wave pulses to said averaging circuit for producing an averaged signal having instantaneous values representative of average values of said square wave pulses,
a differentiating circuit, and
means for applying to said differentiating circuit said averaged signal for producing an output proportional to the rate of change of said averaged signal and in turn proportional to the difference between said reference frequency and said unknown frequency.

3. The frequency-measuring system of claim 2 in which said second pulse generator produces a different control pulse each time during a cycle that the alternating voltage of said unknown frequency passes through zero in a direction opposite to said particular direction,
a second square wave generator connected to said pulse generators for initiating second square wave pulses upon appearance of control pulses from said first pulse generator and terminating each of said square wave pulses upon appearance of each different control pulse from said second pulse generator,
a second averaging circuit,
means for applying said second square wave pulses to said second averaging circuit,
a second differentiating circuit, the output of said second averaging circuit being applied to said second differentiating circuit,
an output circuit, and
sampling means for alternately applying to said output circuit the output signals from said first and said second differentiating circuits.

4. The frequency-measuring system of claim 3 in which said sampling means comprises:
a summing circuit having two inputs,
means for applying said alternating voltage of said reference frequency to one of said inputs and said alternating voltage of said unknown frequency to the other of said inputs,
rectifying means for developing a unidirectional output signal varying in magnitude in accordance with the algebraic sum of corresponding instantaneous values of said alternating voltages, and
circuit-controlling means operable in accordance with said unidirectional output signal for alternately applying to said output circuit said output signals from said first and said second differentiating circuits.

5. The frequency-measuring system of claim 4 in which there are provided
means for balancing the outputs of said differentiating circuits,
said balancing means including a variable resistor, and
switches means selectively operable to connect said variable resistor to the differentiating circuit having the greater output to attenuate the output signal from that differentiating circuit to be equal to the signal from the other of said differentiating circuits.

6. A frequency-measuring system comprising:
a source of a first alternating voltage having an unknown frequency,
a source of a second alternating voltage of known frequency,
first trigger means connected to said source of a first alternating voltage for producing a triger pulse each time the waveform of said unknown frequency is at a particular point in its cycle,
second trigger means connected to said source of a second alternating voltage to produce a trigger pulse each time the waveform of said known frequency is at a particular point in its cycle,
bistable flip-flop means responsive to said trigger pulses for producing output pulses of constant magnitude and of length determined by the relative phase relation of said first and said second alternating voltages,
a smoothing filter, the output of said bistable flip-flop means being connected to said smoothing filter for producing a voltage of magnitude which varies with the difference in phase between said unknown frequency and said known frequency, said voltage resetting between a maximum and minimum value for each 360° of phase difference,
differentiating means, said voltage being applied to said differentiating means,
an output circuit, and
switching means for selectively connecting the output of said differentiating means to said output circuit and for interrupting said connecting during said resetting for producing an output voltage having a magnitude representative of the difference in frequency between said first and said second alternating voltages.

7. A system for producing a frequency-deviation signal in sense and magnitude related to the sense and magnitude of the deviation of an unknown frequency from a reference frequency comprising:
means for producing a signal having time duration variations proportional to the phase displacement between said unknown frequency and said reference frequency,
averaging means, said signal being applied to said averaging means to produce a signal of magnitude varying at a rate proportional to the change in phase between said unknown frequency and said reference frequency and which resets between amplitude limits at predetermined values of the said phase displacement, differentiating means, said voltage being applied to said differentiating means, an output circuit, and switching means for selectively connecting the output of said differentiating means to said output circuit for producing an output having a magnitude corresponding with the amount of deviation between said unknown frequency and said reference frequency and for interrupting said connecting during said times of reset to avoid in the output variations unrelated to said frequency deviation.

8. A system for producing an output signal having a sense and magnitude corresponding to the deviation of a first frequency alternating voltage from a second frequency alternating voltage comprising:

a first bistable flip-flop, means for applying said first and said second frequency alternating voltages to said first bistable flip-flop so that said first bistable flip-flop initiates a square wave each time said first frequency alternating voltage passes through zero in one direction and terminates said square wave each time said second frequency alternating voltage passes through zero in said one direction, a first averaging circuit, the output of said first bistable flip-flop being applied to said first averaging circuit to produce a signal of magnitude varying at a rate proportional to the change in phase between said first frequency and said second frequency, a first differentiator, the output of said first averaging circuit being applied to said first differentiator to produce a first output having a magnitude corresponding with the amount of deviation between said first frequency and said second frequency, a second bistable flip-flop, means for applying said first and said second frequency alternating voltages to said second bistable flip-flop so that a square wave is initiated upon the zero crossing of said first frequency alternating voltage in one direction and said square wave is terminated upon the zero crossing of said second frequency alternating voltage in the other direction, a second averaging circuit, the output of said second bistable flip-flop being applied to said second averaging circuit to produce a signal of magnitude varying at a rate proportional to the change in phase between said first frequency and said second frequency, a second differentiator, the output of said second averaging circuit being applied to said second differentiator to produce a second output having a magnitude corresponding with the amount of deviation between said first frequency and said second frequency, a common output circuit, and a switching circuit for alternately applying said first output and then said second output to said common output.

9. The system recited in claim 8 wherein said switching circuit includes:

a summing circuit having two inputs, means for applying said first frequency alternating voltage to one of said inputs and said second frequency alternating voltage to the other of said inputs, rectifying means for producing an output varying in accordance with the algebraic sum of the instantaneous values of said first and said second frequency alternating voltages, and a relay operable in accordance with the output of said rectifying means for alternately connecting said first output and said second output to said common output.

References Cited by the Examiner
UNITED STATES PATENTS

| | | | |
|---|---|---|---|
| 2,576,900 | 11/1951 | Brockman | 324—79 |
| 2,756,336 | 7/1956 | Christensen | 324—79 X |
| 2,774,872 | 12/1956 | Howsen. | |
| 2,858,425 | 10/1958 | Gordon. | |
| 2,933,682 | 4/1960 | Moulton et al. | 324—79 |
| 2,966,584 | 12/1960 | Isley. | |
| 3,012,200 | 12/1961 | Hurvitz | 324—79 X |

WALTER L. CARLSON, *Primary Examiner.*